US012687442B2

(12) United States Patent
Niino et al.

(10) Patent No.: US 12,687,442 B2
(45) Date of Patent: Jul. 21, 2026

(54) METHOD FOR CONFIRMING INTERNAL STRESS OF RESIN AND APPARATUS FOR MEASURING SAME

(71) Applicants:National Institute of Advanced Industrial Science and Technology, Tokyo (JP); VALQUA, LTD., Tokyo (JP)

(72) Inventors: Hiroyuki Niino, Higashihiroshima (JP); Yehan Qiao, Machida (JP); Tomoaki Yoshiyama, Machida (JP)

(73) Assignees: National Institute of Advanced Industrial Science and Technology, Tokyo (JP); VALQUA, LTD., Tokyo (JP)

( * ) Notice: Subject to any disclaimer, the term of this patent is extended or adjusted under 35 U.S.C. 154(b) by 306 days.

(21) Appl. No.: 18/694,683

(22) PCT Filed: Aug. 31, 2022

(86) PCT No.: PCT/JP2022/032704
§ 371 (c)(1),
(2) Date: Mar. 22, 2024

(87) PCT Pub. No.: WO2023/047902
PCT Pub. Date: Mar. 30, 2023

(65) Prior Publication Data
US 2025/0052628 A1     Feb. 13, 2025

(30) Foreign Application Priority Data

Sep. 24, 2021     (JP) .................................. 2021-155645

(51) Int. Cl.
G01L 1/24 (2006.01)

(52) U.S. Cl.
CPC .................................... G01L 1/248 (2013.01)

(58) Field of Classification Search
CPC ... G01L 1/248; G01L 1/00; G01L 1/24; G01L 1/241
See application file for complete search history.

(56) References Cited

U.S. PATENT DOCUMENTS

2018/0274997 A1* 9/2018 Shang ...................... G01L 1/241

FOREIGN PATENT DOCUMENTS

CN          103630441 A     3/2014
CN          105424242 A  *  3/2016  ............... G01L 1/24
(Continued)

*Primary Examiner* — Francis C Gray
(74) *Attorney, Agent, or Firm* — The Webb Law Firm

(57)          ABSTRACT

To provide an internal stress confirming method of a resin which is capable of measuring an internal stress of a translucent resin such as a fluororesin and a fluororubber and dynamically confirming stress propagation, and an apparatus measuring for the same. The internal stress confirming method for confirming an internal stress of a measurement target containing a translucent resin includes irradiating the measurement target with near-infrared light having a peak wavelength in a near-infrared band of 800 nm to 2500 nm through frosted glass, a polarizer, and a ¼ wavelength plate; acquiring a near-infrared image by imaging the measurement target through a ¼ wavelength plate and an analyzer; and confirming the internal stress of the measurement target based on the near-infrared image.

18 Claims, 5 Drawing Sheets

(56) References Cited

FOREIGN PATENT DOCUMENTS

| CN | 110243829 | A | | 9/2019 | |
|----|-----------|---|---|--------|---|
| CN | 119000531 | A | * | 11/2024 | ............ G01N 21/65 |
| JP | S61253436 | A | * | 11/1986 | |
| JP | 2007033223 | A | * | 2/2007 | |
| JP | 2017125770 | A | | 7/2017 | |
| WO | WO-2019163989 | A1 | * | 8/2019 | ........... G01N 21/958 |

* cited by examiner

[Fig. 1]
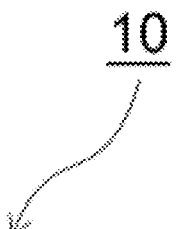
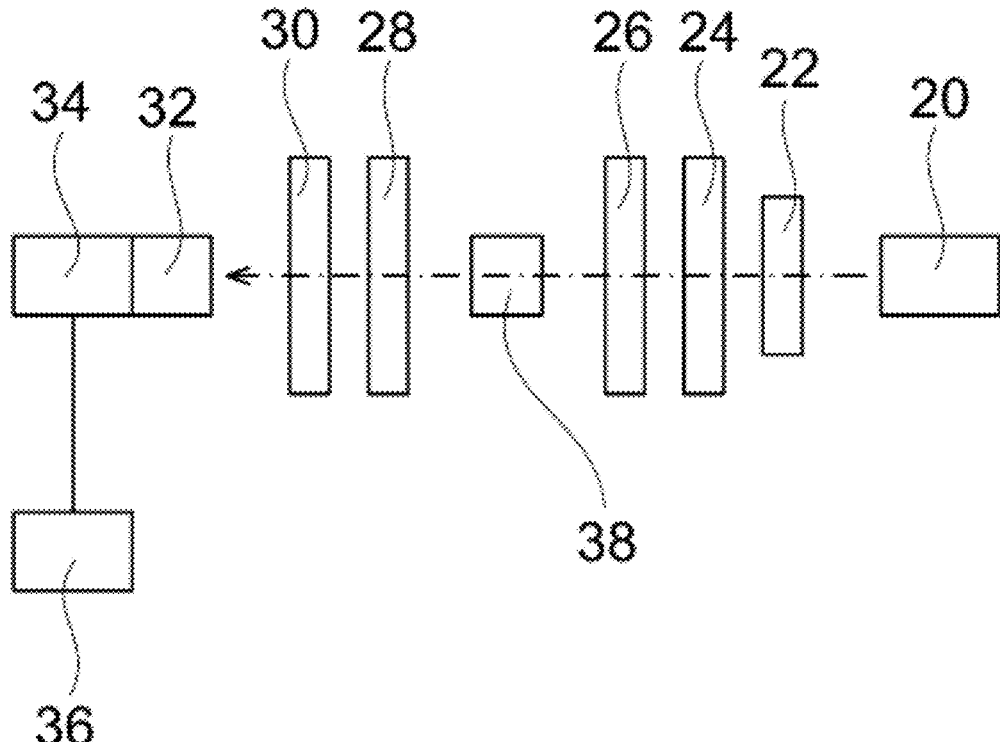

[Fig. 2]
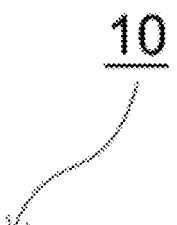
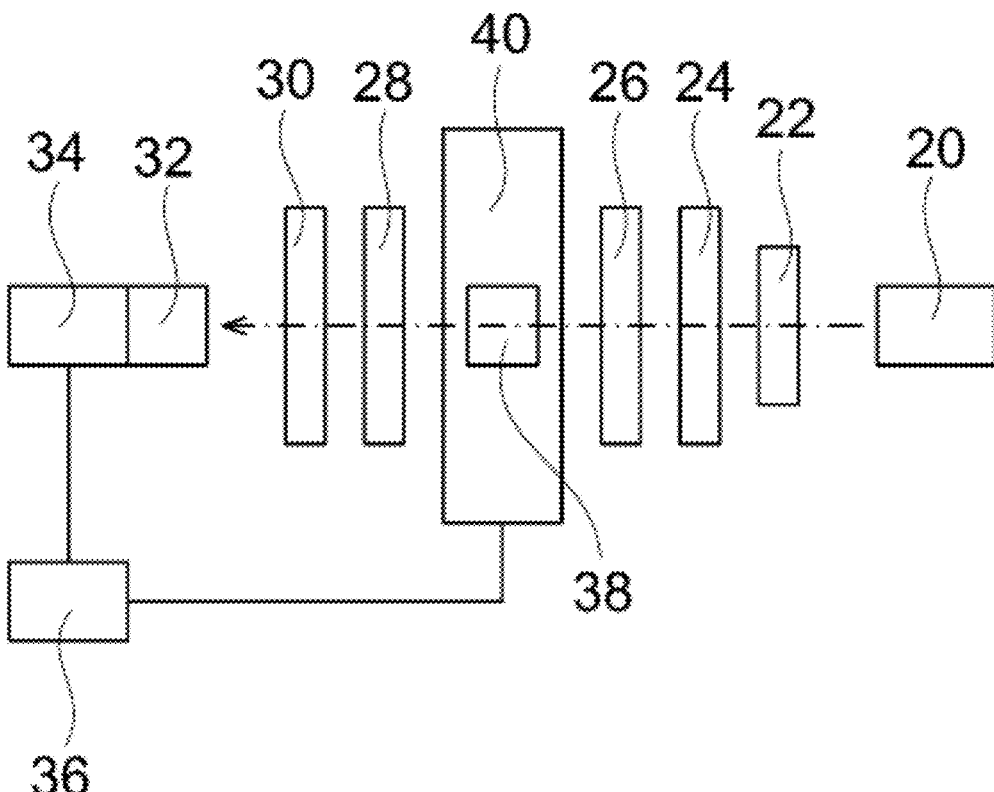

[Fig. 3]
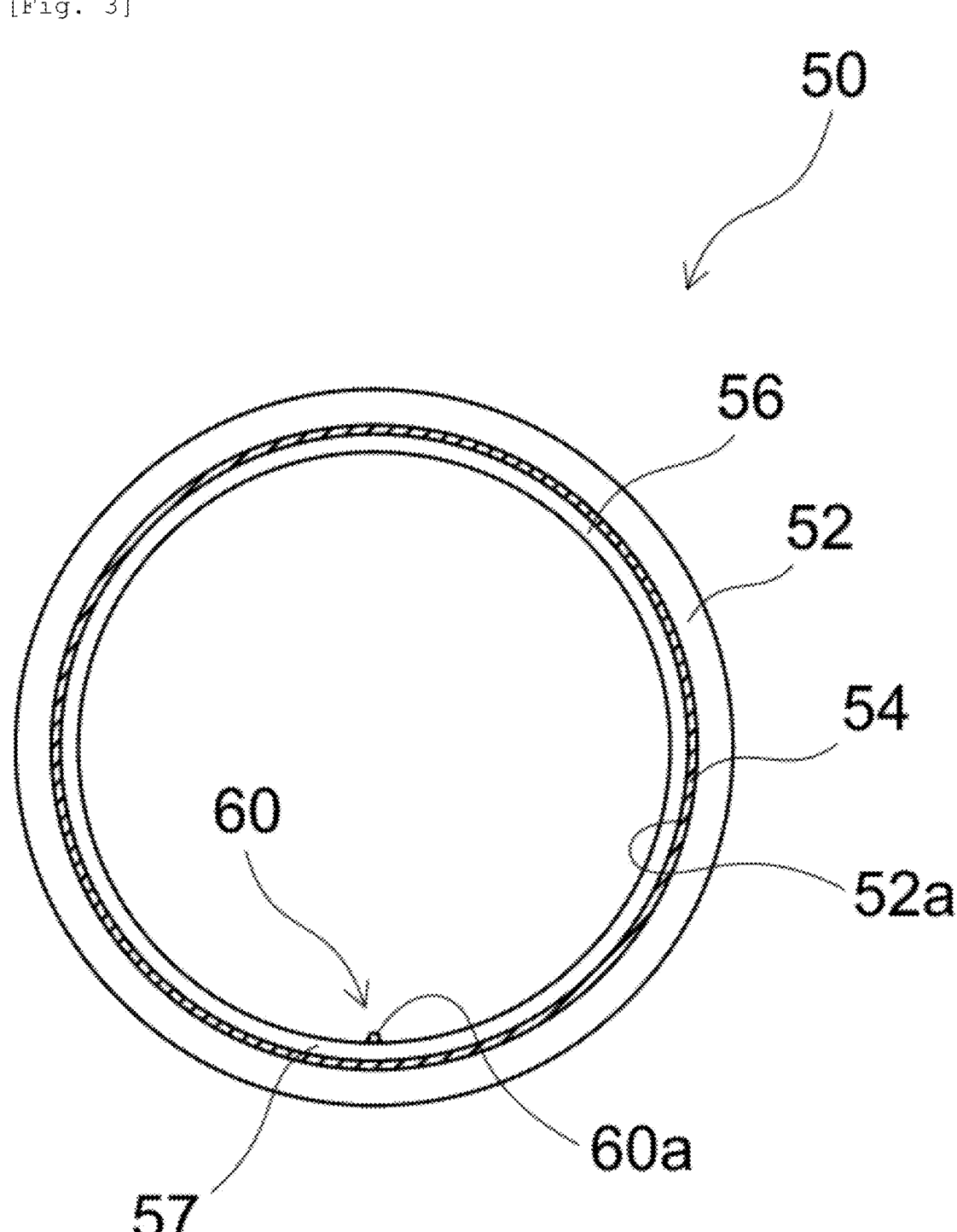

[Fig. 4]
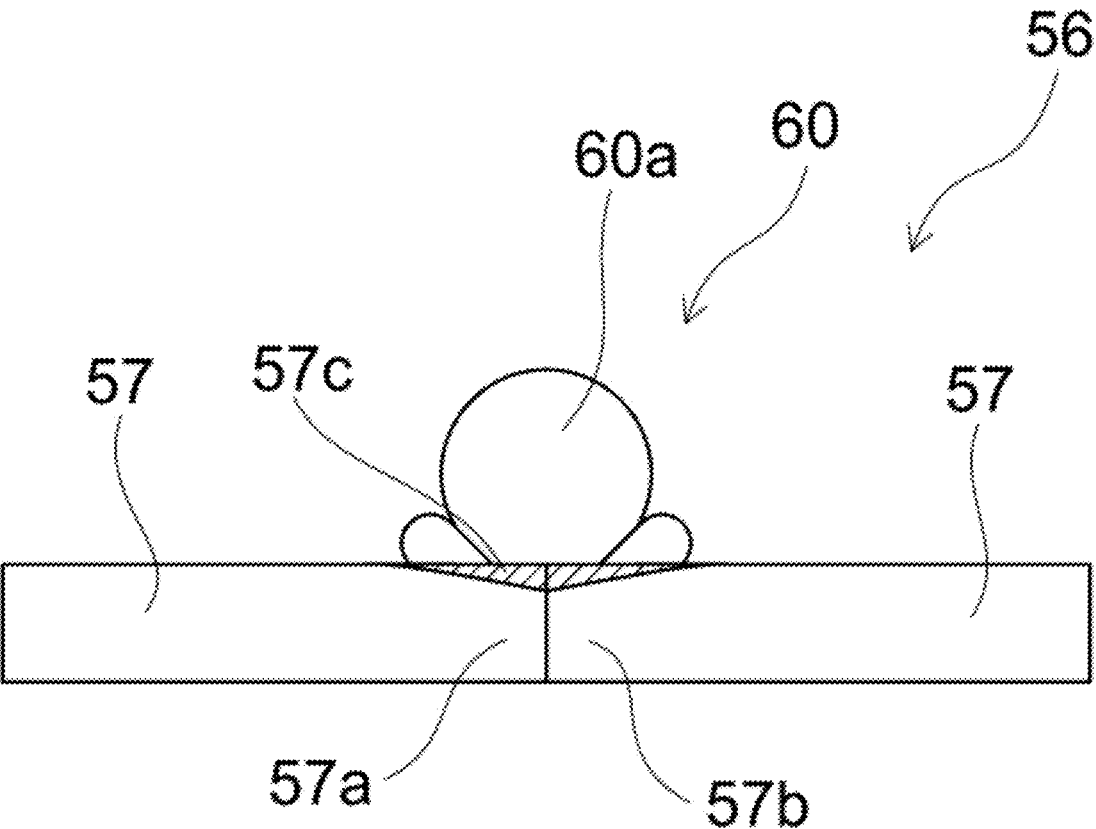
[Fig. 5]
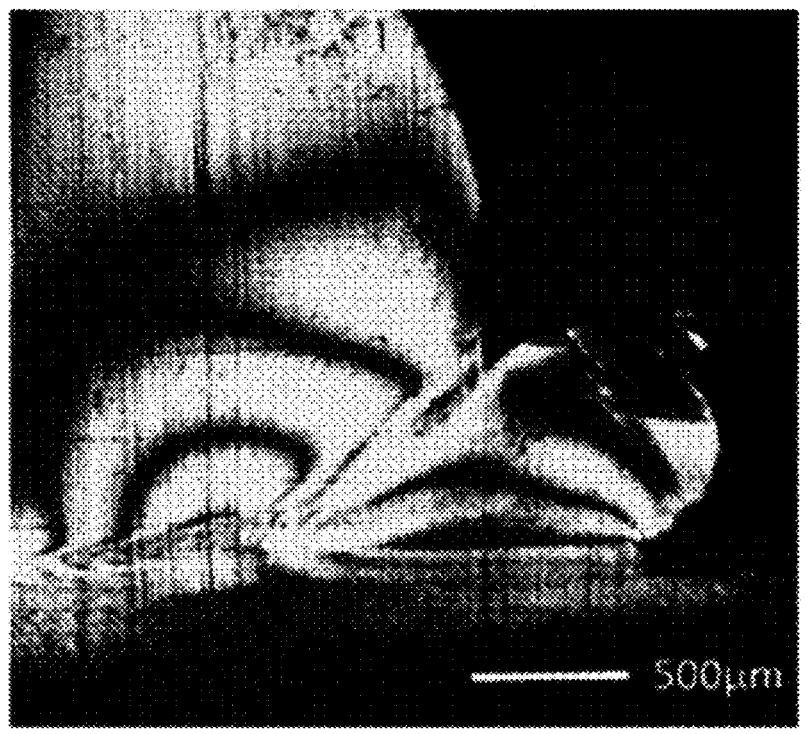

[Fig. 6]
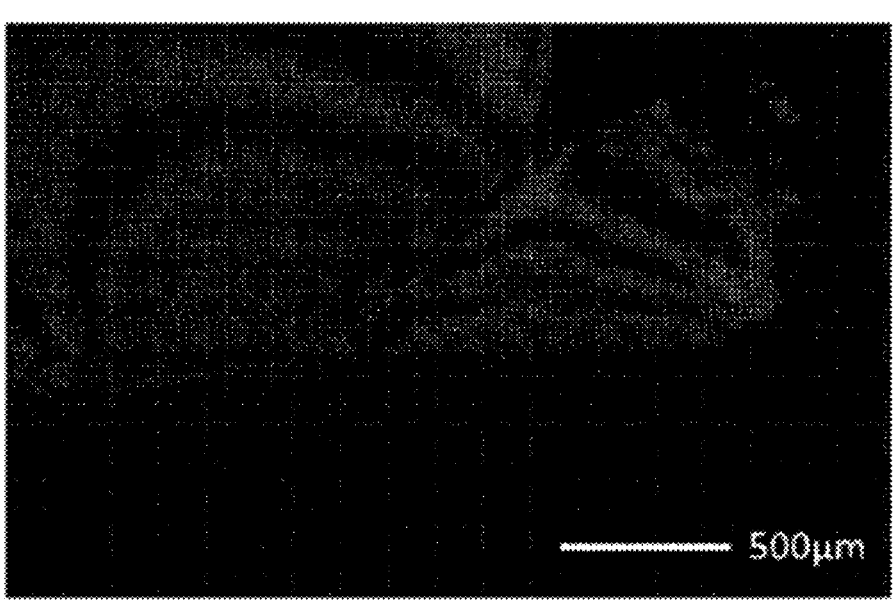

METHOD FOR CONFIRMING INTERNAL STRESS OF RESIN AND APPARATUS FOR MEASURING SAME

CROSS-REFERENCE TO RELATED APPLICATIONS

This application is the United States national phase of International Application No. PCT/JP2022/032704 filed Aug. 31, 2022, and claims priority to Japanese Patent Application No. 2021-155645 filed Sep. 24, 2021, the disclosures of which are hereby incorporated by reference in their entireties.

BACKGROUND OF THE INVENTION

Field of the Invention

The present invention relates to an internal stress confirming method of a resin which is capable of dynamically confirming an internal stress and stress propagation of a translucent resin such as a fluororesin and a fluororubber, and apparatus for measuring the same.

Description of Related Art

In the related art, a two-dimensional birefringence distribution evaluation apparatus has been used to confirm an internal stress of a resin. The two-dimensional birefringence distribution evaluation apparatus is an evaluation apparatus based on a photoelasticity method, and can measure birefringence of a measurement target by irradiating the measurement target with visible light from a visible light source and detecting light transmitted through the measurement target, and determine an internal stress of the measurement target from the birefringence.

Specifically, the measurement target can be obtained as a visible light image represented by a gradation based on the intensity of visible light by imaging the measurement target with visible light. The gradation in the visible light image obtained as described above represents a stress distribution of the measurement target.

However, the internal stress can be measured by using visible light only for a transparent material such as glass and an epoxy resin through which visible light is transmitted, and for a measurement target through which visible light is not transmitted, the internal stress cannot be obtained by the photoelasticity method using visible light.

For this reason, for a measurement target through which visible light is not transmitted, for example, a method using a strain gauge or a method using near-infrared light as disclosed in Patent Literature 1 (i.e., JP 2007-33223 A) is used.

SUMMARY OF THE INVENTION

Technical Problem

In the method using the strain gauge, since the strain gauge is attached to a surface of a measurement target and measurement is performed, only a stress at a position where the strain gauge is attached can be measured. For this reason, in order to obtain the stress distribution, it is necessary to perform measurement using a large number of strain gauges, and the work becomes complicated.

In addition, in the method disclosed in Patent Literature 1, even in a measurement target having a low transmittance in a visible light region, a stress value at a specific point and a stress distribution thereof can be measured by near-infrared light, but it is not possible to continuously confirm movement of stress, and it is not possible to verify how stress concentrates on the measurement target and how fracture occurs.

In addition, in the related art, a method for dynamically confirming an internal stress and stress propagation of a translucent resin such as a fluororesin and a fluororubber has not been established, and it was difficult to measure the internal stress of the translucent resin or dynamically confirm the stress propagation.

In consideration of such circumstances, an object of the present invention is to provide an internal stress confirming method of a resin which is capable of measuring an internal stress of a translucent resin such as a fluororesin and a fluororubber or dynamically confirming stress propagation, and an apparatus for measuring the same.

Solution to Problem

The present invention has been made to solve the problems in the related art as described above, and the present invention includes the following configurations.

[1] An internal stress confirming method for confirming an internal stress of a measurement target containing a translucent resin, including:
irradiating the measurement target with near-infrared light having a peak wavelength in a near-infrared band of 800 nm to 2500 nm through a polarizer;
acquiring a near-infrared image by imaging the measurement target through an analyzer; and
confirming the internal stress of the measurement target based on the near-infrared image.

[2] The internal stress confirming method according to [1], wherein a ¼ wavelength plate is provided between the analyzer and the measurement target.

[3] The internal stress confirming method according to [2], wherein a ¼ wavelength plate is provided between the polarizer and the measurement target.

[4] The internal stress confirming method according to any one of [1] to [3], wherein frosted glass is provided between the near-infrared light source and the polarizer.

[5] The internal stress confirming method according to [1] to [4], wherein the internal stress is confirmed while an external load is applied to the measurement target.

[6] The internal stress confirming method according to any one of [1] to [5], wherein a peak wavelength of the near-infrared light is 940 nm to 950 nm.

[7] The internal stress confirming method according to any one of [1] to [6], wherein the near-infrared image is a still image or a moving image.

[8] The internal stress confirming method according to any one of [1] to [7], wherein the translucent resin is a fluororesin or a fluororubber.

[9] The internal stress confirming method according to any one of [1] to [8], wherein the measurement target containing the translucent resin is any one of a tube of a piping material product, a sheet lining container, a tank component, a lining component, a square tank, an O-ring, a welded portion of a product, and a fluororesin lining layer of a lining tank.

[10] An internal stress measuring apparatus for confirming an internal stress of a measurement target containing a translucent resin, including:

a near-infrared light source that irradiates the measurement target with near-infrared light having a peak wavelength in a near-infrared band of 800 nm to 2500 nm;

a near-infrared camera that detects near-infrared light transmitted through the measurement target and two-dimensionally images the measurement target; and a computer that measures the internal stress of the measurement target based on a near-infrared image captured by the near-infrared camera, wherein the measurement target is irradiated with the near-infrared light from the near-infrared light source through a polarizer, and the near-infrared image is acquired by imaging the measurement target with the near-infrared camera through an analyzer.

[11] The internal stress measuring apparatus according to [10], wherein a ¼ wavelength plate is provided between the analyzer and the measurement target.

[12] The internal stress measuring apparatus according to [11], wherein a ¼ wavelength plate is provided between the polarizer and the measurement target.

[13] The internal stress measuring apparatus according to any one of to [12], wherein frosted glass is provided between the near-infrared light source and the polarizer.

[14] The internal stress measuring apparatus according to any one of to [13], further including: a mechanical strength measuring instrument that applies a load to the measurement target from the outside.

[15] The internal stress measuring apparatus according to any one of to [14], wherein a peak wavelength of near-infrared light emitted from the near-infrared light source is 940 nm to 950 nm.

[16] The internal stress measuring apparatus according to any one of to [15], wherein the near-infrared image captured by the near-infrared camera is a still image or a moving image.

[17] The internal stress measuring apparatus according to any one of to [16], wherein the translucent resin is a fluororesin or a fluororubber.

[18] The internal stress measuring apparatus according to any one of to [17], wherein the measurement target containing the translucent resin is any one of tubes of a piping material product, a sheet lining container, a tank component, a lining component, a square tank, an O-ring, a welded portion of a product, and a fluororesin lining layer of a lining tank.

Advantageous Effects of Invention

According to the present invention, it is possible to measure a residual stress of a translucent resin such as a fluororesin and a fluororubber, for example, by capturing a near-infrared image based on a stress distribution of a measurement target by using near-infrared light.

In addition, it is possible to continuously confirm a change in the internal stress in real time by capturing a near-infrared image while applying a load to a measurement target from the outside by a mechanical strength measuring instrument such as a tensile testing instrument and a compression testing instrument. For this reason, for example, it is possible to confirm a fracture route in a joint portion of a joined fluororesin, and the present invention is useful for examination of welding conditions.

BRIEF DESCRIPTION OF THE DRAWINGS

FIG. 1 is a schematic diagram illustrating a configuration of an internal stress measuring apparatus according to the present embodiment.

FIG. 2 is a schematic diagram illustrating a configuration of an internal stress measuring apparatus according to another embodiment.

FIG. 3 is a schematic view illustrating a configuration of a lining tank which is an example of a measurement target.

FIG. 4 is a schematic view explaining a joint portion between lining sheets in the lining tank of FIG. 3.

FIG. 5 is an example of a near-infrared image captured by using the internal stress measuring apparatus of the present embodiment while a tensile load is applied to the joint portion shown in FIG. 4 by a tensile testing instrument.

FIG. 6 is an example of a visible light image captured while a tensile load is applied to the joint portion shown in FIG. 4 by the tensile testing instrument by using a conventional two-dimensional birefringence distribution evaluation apparatus.

DESCRIPTION OF THE INVENTION

Hereinafter, embodiments (examples) of the present invention will be described in more detail with reference to the accompanying drawings.

FIG. 1 is a schematic diagram illustrating a configuration of an internal stress measuring apparatus according to a present embodiment.

As shown in FIG. 1, an internal stress measuring apparatus 10 of the present embodiment includes a near-infrared light source 20, frosted glass 22, a polarizer 24, a ¼ wavelength plate 26, a ¼ wavelength plate 28, an analyzer 30, a zoom lens 32, a near-infrared camera 34, and a computer 36.

The near-infrared light source 20 is a light source capable of emitting near-infrared light having a peak wavelength in a near-infrared band of 800 nm to 2500 nm. As such a near-infrared light source 20, for example, a light-emitting diode (LED), a xenon lamp, a tungsten lamp, a halogen lamp, a laser, or an incandescent lamp can be used.

The peak wavelength of the near-infrared light is preferably appropriately set in correspondence with a measurement target. For example, when the measurement target is a fluororesin, the peak wavelength of near-infrared light is preferably 940 nm to 950 nm.

The frosted glass 22 is an optical element having an effect of diffusing the near-infrared light emitted from the near-infrared light source 20 and smoothing a luminance distribution of the near-infrared light. In the present invention, the frosted glass 22 is not an essential component. The polarizer 24 is a polarizing plate having polarizing performance with respect to the near-infrared light emitted from the near-infrared light source 20. In the near-infrared light diffused by the frosted glass 22, only near-infrared light polarized in a predetermined direction can be transmitted through the polarizer 24, and the other light is blocked.

The ¼ wavelength plate 26 is an optical element that converts the near-infrared light polarized to linearly polarized light by the polarizer 24 into circularly polarized light. Note that, in the present invention, the ¼ wavelength plate 26 is not an essential component.

The ¼ wavelength plate 28 is an optical element that converts the near-infrared light converted into circularly polarized light by the ¼ wavelength plate 26 into linearly polarized light. Note that, in the present invention, the ¼ wavelength plate 28 is not an essential component, but is necessarily provided when the ¼ wavelength plate 26 is provided.

The analyzer 30 is a polarizing plate having polarizing performance with respect to the near-infrared light emitted from the near-infrared light source 20. In the near-infrared light converted into the linearly polarized light by the ¼ wavelength plate 28, only near-infrared light polarized in a predetermined direction can be transmitted through the analyzer 30, and the other light is blocked. Note that, a polarization direction of the analyzer 30 is adjusted to be orthogonal to a polarization direction of the polarizer 24.

The zoom lens 32 is a lens whose focal length (optical magnification) can be arbitrarily changed. The focal length is adjusted by the zoom lens 32 so as to form an image in the near-infrared camera 34. Such a zoom lens 32 is not particularly limited, but for example, L-815 or L-817 manufactured by HOZAN TOOL INDUSTRIAL CO., LTD. can be used. Note that, in the present invention, the zoom lens 32 is not an essential component.

The near-infrared camera 34 is not particularly limited as long as it is a camera capable of detecting near-infrared light transmitted through a measurement target and two-dimensionally imaging the measurement target, and for example, a complementary MOS (CMOS) camera, or a charge coupled device (CCD) camera can be used. In addition, such a near-infrared camera 34 may be capable of capturing a still image or may be capable of capturing a moving image. Specifically, for example, L-836 and L-834 manufactured by HOZAN TOOL INDUSTRIAL CO., LTD. can be used.

The computer 36 is not particularly limited as long as computer 36 includes, for example, an arithmetic operation unit, a storage unit, and an input/output unit, and may be, for example, a personal computer or a workstation, or may be a microcontroller.

In the internal stress measuring apparatus 10 of the present embodiment configured as described above, a sample 38, which is a translucent resin whose internal stress is desired to be confirmed, is disposed between the ¼ wavelength plate 26 and the ¼ wavelength plate 28 as a measurement target. In this state, the near-infrared light is emitted from the near-infrared light source 20, transmitted light transmitted through the sample 38 is detected by the near-infrared camera 34, and the computer 36 calculates the internal stress of the sample 38 based on the detected transmitted light.

Specifically, by imaging the sample 38 with near-infrared light by the near-infrared camera 34, the sample 38 can be obtained as a still image or a moving image (hereinafter, the image is referred to as a "near-infrared image") represented by a gradation based on the intensity of near-infrared light. Note that, the near-infrared image is an image represented by gray scale, and in the present embodiment, a color matching line appears by a gradation. Depending on the presence or absence of the ¼ wavelength plates 26 and 28, not only an isochromatic line but also the isoclinic line may appear.

The gradation in the near-infrared image obtained as described above indicates a stress distribution of the sample 38, and a stress value at a specific position of the sample 38 can be obtained from the stress distribution. Therefore, when the gradation in the near-infrared image is clear, the stress distribution of the sample 38 can be accurately confirmed.

Note that, in the present specification, "translucent" represents that a transmittance of near-infrared light as described above is approximately 45% to 75%. On the other hand, "transparent" represents that the transmittance of near-infrared light as described above is approximately 75% to 100%.

In addition, the sample 38 may consist of only a translucent resin, or may be one in which a translucent resin and a transparent resin are joined. The translucent resin is not particularly limited, and examples thereof include a fluorine resin such as tetrafluoroethylene-perfluoroalkyl vinyl ether copolymer (PFA), polytetrafluoroethylene (PTFE), tetrafluoroethylene-hexafluoropropylene copolymer (FEP), tetrafluoroethylene-ethylene copolymer (ETFE), polyvinylidene fluoride (PVDF), polychlorotrifluoroethylene (PCTFE), and chlorotrifluoroethylene-ethylene copolymer (ECTFE), and a fluorine rubber such as tetrafluoroethylene-perfluorovinyl ether (FFKM) and vinylidene fluoride (FKM).

Table 1 shows results of comparison between a near-infrared image obtained by near-infrared light by using the internal stress measuring apparatus 10 of the present embodiment and a visible light image obtained by visible light by using a conventional two-dimensional birefringence distribution evaluation apparatus.

TABLE 1

| | | Examples | | Comparative Examples | | | |
|---|---|---|---|---|---|---|---|
| Samples | | No. 1 | No. 2 | No. 3 | No. 4 | No. 5 | No. 6 |
| Color | | Translucent | Translucent + transparent | Transparent | Opaque | Transparent | Transparent |
| Kind of resin | | One kind | Two kinds | One kind | | | |
| Details of resin | | PTFE (Thermally modified portion) | PTFE + PFA (Thermally modified portion) | PFA | PTFE | ETFE | FKM |
| Thickness (mm) | | | | 0.5 | | | |
| Average transmittance (%) | Visible light 400 nm to 800 nm | 50 to 64 | 76 to 91 | 95 to 97 | 47 to 50 | 93 to 95 | 91 to 96 |
| | Near-infrared light 800 nm to 1500 nm | 59 to 78 | 59 to 94 | 92 to 94 | 6 to 11 | 75 to 93 | 72 to 82 |
| Stress distribution (visual observation) | Visible light image | Blurred | Blurred | Clear | invisible | Clear | Clear |
| | Near-infrared image | Clear | Clear | Clear | invisible | Clear | Clear |

Note that, a thermally modified portion of PTFE as Sample No. 1 represents, for example, a portion of PTFE in a state where PTFE is heated to a high temperature by welding and is modified. In addition, Sample No. 2 is obtained by welding PTFE and PFA, and the welded surface between PTFE and PFA serves as a thermally modified portion. In Sample No. 2, PTFE is a translucent resin, and PFA is a transparent resin.

As shown in Table 1, in Sample Nos. 1 and 2, the gradation was blurred in the visible light image, and the stress distribution could not be accurately confirmed. On the other hand, in the near-infrared image, gradation was clearly visible, and the stress distribution could be accurately confirmed. That is, even in the case of a resin having a low transmittance with respect to visible light as in Sample Nos. 1 and 2, when the transmittance with respect to near-infrared light is high, the stress distribution can be confirmed by using near-infrared light.

In addition, in Sample Nos. 3, 5, and 6, the gradation was clearly visible in both the visible light image and the near-infrared image, and the stress distribution could be accurately confirmed. That is, in the case of a transparent resin having a high transmittance for both visible light and near infrared light as in Sample Nos. 3, 5, and 6, the stress distribution can be confirmed by visible light without using near infrared light. In addition, in Sample No. 4, the gradation was blurred in both the visible light image and the near-infrared image, and the stress distribution could not be accurately confirmed. That is, in the case of an opaque resin having a low transmittance with respect to near-infrared light as in Sample No. 4, the stress distribution cannot be confirmed even when near-infrared light is used.

Table 2 shows a maximum transmittance of visible light and near infrared light at each film thickness for the thermally modified portion of PTFE.

TABLE 2

| | Film thickness(μm) | | | | | | | |
|---|---|---|---|---|---|---|---|---|
| | 150 | 200 | 350 | 500 | 800 | 1500 | 3500 | 5000 |
| Visible light | X | X | Δ | Δ | Δ | X | X | X |
| Near-infrared light | ○○ | ○○ | ○○ | ○○ | ○○ | Δ | Δ | X |

X: 0 to 30%,
Δ: 31 to 45,
○: 46 to 70%,
○○: 71 to 100%

As shown in Table 2, in the thermally modified portion of PTFE, even when the film thickness is small, visible light is not sufficiently transmitted, and thus the conventional two-dimensional birefringence distribution evaluation apparatus using visible light cannot measure the internal stress. On the other hand, when the film thickness of the thermally modified portion of PTFE is 800 μm or less, near infrared light can be sufficiently transmitted, and thus the internal stress measuring apparatus 10 of the present embodiment can accurately measure the internal stress.

FIG. 2 is a schematic diagram illustrating a configuration of an internal stress measuring apparatus according to another embodiment.

The internal stress measuring apparatus 10 shown in FIG. 2 basically has a similar configuration as in the internal stress measuring apparatus 10 shown in FIG. 1, and the same components are denoted by the same reference numerals, and detailed description thereof will be omitted.

In the internal stress measuring apparatus 10 of the present embodiment, a tensile testing instrument 40 is provided between the ¼ wavelength plate 26 and the ¼ wavelength plate 28, the sample 38 is installed in the tensile testing instrument 40, and stress propagation of the sample 38 can be confirmed while applying a tensile load to the sample 38.

In such an internal stress measuring apparatus 10, it is preferable that the near-infrared camera 34 can capture a moving image. The stress propagation of the sample 38 can be dynamically observed by capturing a moving image of the sample 38.

In the present embodiment, the tensile testing instrument 40 capable of applying a tensile load to the sample 38 is used, but various mechanical strength measuring instruments capable of externally applying a load that generates an internal stress to the sample 38, for example, a compression testing instrument capable of applying a compressive load to the sample 38 may be used.

More specifically, the internal stress measuring apparatus 10 of the present embodiment can be used to measure a stress distribution and to dynamically observe stress propagation by using, for example, a fluororesin lining layer of a lining tank in which a fluororesin lining layer is formed by a sheet lining method as the sample 38.

For example, as shown in FIG. 3, in a lining tank 50, a lining sheet consisting of polytetrafluoroethylene (PTFE) is bonded to an inner surface 52a of a can body 52 through an adhesive layer 54 to form a lining layer 56.

Note that, a material of the can body 52 is not particularly limited as long as the material is a material excellent in corrosion resistance, heat resistance, and mechanical strength, and examples thereof include stainless steel, carbon steel, and iron. In addition, the thickness of the can body 52 is typically in a range of 1 to 10 mm, preferably 3 to 6 mm.

Examples of the adhesive for forming the adhesive layer 54 include rubber-based adhesive and epoxy-based adhesive. In addition, the thickness of the adhesive layer 54 is not particularly limited as long as the lining layer 56 can be stretched and held at a predetermined position at low cost regardless of the usage mode of the lining tank 50, but the thickness is typically in a range of 0.1 to 1 mm, preferably 0.3 to 0.6 mm.

The lining layer 56 is formed from a plurality of lining sheets, and the lining sheets are joined to each other by a joint portion 60 as shown in FIG. 4. In the present embodiment, the joint portion 60 is formed by welding lining sheets 57 consisting of polytetrafluoroethylene (PTFE) to each other with a tetrafluoroethylene-perfluoroalkyl vinyl ether copolymer (PFA). Specifically, a welded portion 60a is formed by PFA welding in a state in which end portions 57a and 57b of the lining sheet 57 are butted against each other. Note that, in a portion of the lining sheet 57 that is in contact with the welded portion 60a, a thermally modified portion 57c is generated by heating during the welding.

In the internal stress measuring apparatus 10 of the present embodiment, since stress distribution in the lining layer 56 (PTFE) of the lining tank 50 and the joint portion 60 (PTFE+PFA) can be measured and stress propagation can be dynamically confirmed, a fracture route of the lining layer 56 and the joint portion 60 can be confirmed and the internal stress measuring apparatus 10 can be used, for example, for examination of welding conditions.

FIG. 5 is an example of a near-infrared image captured while applying a tensile load to the joint portion shown in FIG. 4 by a tensile testing instrument by using the internal stress measuring apparatus of the present embodiment, and FIG. 6 is an example of a visible light image captured while applying a tensile load to the joint portion shown in FIG. 4 by a tensile testing instrument by using a conventional two-dimensional birefringence distribution evaluation apparatus.

Note that, when the joint portion 60 is observed, the sample 38 is obtained by cutting the lining layer 56 including the joint portion 60 so as to have a film thickness of 500 µm, and a near-infrared image and a visible light image are captured by using the internal stress measuring apparatus of the present embodiment and the conventional two-dimensional birefringence distribution evaluation apparatus while a tensile load is applied to the sample 38.

As illustrated in FIG. 5, in the near-infrared image, it can be clearly seen with visual observation that the stress distribution is biased by applying a tensile load to the joint portion 60. In addition, in the near-infrared image illustrated in FIG. 5, the stress distribution can also be confirmed for the thermally modified portion 57*c* of the lining layer 56.

On the other hand, as illustrated in FIG. 6, the visible light image is blurred, and the bias of the stress distribution cannot be clearly confirmed with visual observation. In addition, the stress distribution cannot be confirmed at all for the thermally modified portion 57*c* of the lining layer 56.

Although the preferred embodiments of the present invention have been described above, the present invention is not limited thereto, and in the above Examples, the case of the fluororesin lining layer of the lining tank has been described as an example as a sample that is a translucent resin. However, the translucent resin can be a tube such as a flexible hose or a corrugated tube of a piping material product, a sheet lining container, a tank portion, a lining component, a square tank, or an O-ring, or can be a welded portion of a product, for example, and various modifications can be made without departing from the object of the present invention.

REFERENCE SIGNS LIST

10 Internal stress measuring apparatus
20 Near-infrared light source
22 Frosted glass
24 Polarizer
26 ¼ wavelength plate
28 ¼ wavelength plate
30 Analyzer
32 Zoom lens
34 Near-infrared camera
36 Computer
38 Sample
40 Tensile testing instrument
50 Lining tank
52 Can body
52*a* Inner surface
54 Adhesive layer
56 Lining layer
57 Lining sheet
57*a* End portion
57*b* End portion
57*c* Thermally modified portion
60 Joint portion
60*a* Welded portion

The invention claimed is:

1. An internal stress confirming method for confirming an internal stress of a measurement target containing a translucent resin, comprising:

irradiating the measurement target with near-infrared light having a peak wavelength in a near-infrared band of 800 nm to 2500 nm through a polarizer;

acquiring a near-infrared image by imaging the measurement target through an analyzer; and confirming the internal stress of the measurement target based on the near-infrared image.

2. The internal stress confirming method according to claim 1, wherein a ¼ wavelength plate is provided between the analyzer and the measurement target.

3. The internal stress confirming method according to claim 2, wherein a ¼ wavelength plate is provided between the polarizer and the measurement target.

4. The internal stress confirming method according to claim 1, wherein frosted glass is provided between a near-infrared light source and the polarizer.

5. The internal stress confirming method according to claim 1, wherein the internal stress is confirmed while an external load is applied to the measurement target.

6. The internal stress confirming method according to claim 1, wherein a peak wavelength of the near-infrared light is 940 nm to 950 nm.

7. The internal stress confirming method according to claim 1, wherein the near-infrared image is a still image or a moving image.

8. The internal stress confirming method according to claim 1, wherein the translucent resin is a fluororesin or a fluororubber.

9. The internal stress confirming method according to claim 1, wherein the measurement target containing the translucent resin is any one of a tube of a piping material product, a sheet lining container, a tank component, a lining component, a square tank, an O-ring, a welded portion of a product, and a lining layer of a lining tank.

10. An internal stress measuring apparatus for confirming an internal stress of a measurement target containing a translucent resin, comprising:

a near-infrared light source that irradiates the measurement target with near-infrared light having a peak wavelength in a near-infrared band of 800 nm to 2500 nm;

a near-infrared camera that detects near-infrared light transmitted through the measurement target and two-dimensionally images the measurement target; and a computer that measures the internal stress of the measurement target based on a near-infrared image captured by the near-infrared camera, wherein the measurement target is irradiated with the near-infrared light from the near-infrared light source through a polarizer, and the near-infrared image is acquired by imaging the measurement target with the near-infrared camera through an analyzer.

11. The internal stress measuring apparatus according to claim 10, wherein a ¼ wavelength plate is provided between the analyzer and the measurement target.

12. The internal stress measuring apparatus according to claim 11, wherein a ¼ wavelength plate is provided between the polarizer and the measurement target.

13. The internal stress measuring apparatus according to claim 10, wherein frosted glass is provided between the near-infrared light source and the polarizer.

14. The internal stress measuring apparatus according to claim 10, further comprising: a mechanical strength measuring instrument that applies a load to the measurement target from the outside.

15. The internal stress measuring apparatus according to claim 10, wherein a peak wavelength of near-infrared light emitted from the near-infrared light source is 940 nm to 950 nm.

16. The internal stress measuring apparatus according to claim 10, wherein the near-infrared image captured by the near-infrared camera is a still image or a moving image.

17. The internal stress measuring apparatus according to claim 10, wherein the translucent resin is a fluororesin or a fluororubber.

18. The internal stress measuring apparatus according to claim 10, wherein the measurement target containing the translucent resin is any one of a tube of a piping material product, a sheet lining container, a tank component, a lining component, a square tank, an O-ring, a welded portion of a product, and a lining layer of a lining tank.

\*　\*　\*　\*　\*